(12) United States Patent
Erignac

(10) Patent No.: US 11,475,779 B2
(45) Date of Patent: Oct. 18, 2022

(54) SYSTEM AND METHOD FOR CLEARANCE-BASED TAXI ROUTE EXECUTION

(71) Applicant: The Boeing Company, Chicago, IL (US)

(72) Inventor: Charles A. Erignac, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 444 days.

(21) Appl. No.: 16/596,598

(22) Filed: Oct. 8, 2019

(65) Prior Publication Data

US 2021/0104164 A1 Apr. 8, 2021

(51) Int. Cl.
| | |
|---|---|
| *G08G 5/06* | (2006.01) |
| *B64C 39/02* | (2006.01) |
| *G05D 1/02* | (2020.01) |
| *G08G 5/00* | (2006.01) |

(52) U.S. Cl.
CPC ........... *G08G 5/065* (2013.01); *B64C 39/024* (2013.01); *G05D 1/0223* (2013.01); *G08G 5/0013* (2013.01); *B64C 2201/12* (2013.01)

(58) Field of Classification Search
CPC .... G08G 5/065; G08G 5/0013; G08G 5/0021; G05D 1/0223; B64C 2201/12; B64C 39/024; B64F 1/002; G01C 21/3626
USPC ............................................................. 701/3
See application file for complete search history.

(56) References Cited

U.S. PATENT DOCUMENTS

| | | | | |
|---|---|---|---|---|
| 6,278,965 | B1* | 8/2001 | Glass | G06Q 10/025 |
| | | | | 701/120 |
| 2004/0049335 | A1* | 3/2004 | Schmidt | G01C 21/3461 |
| | | | | 701/431 |
| 2016/0117933 | A1* | 4/2016 | Chan | G08G 5/0086 |
| | | | | 705/317 |
| 2016/0140849 | A1* | 5/2016 | Ball | G08G 5/0021 |
| | | | | 701/538 |
| 2016/0140855 | A1* | 5/2016 | Gannon | G08G 5/0021 |
| | | | | 701/533 |
| 2016/0275801 | A1* | 9/2016 | Kopardekar | G08G 5/0069 |
| 2018/0061243 | A1* | 3/2018 | Shloosh | G08G 5/0091 |
| 2018/0181125 | A1* | 6/2018 | Ceccom | G08G 5/0008 |
| 2019/0244528 | A1* | 8/2019 | Srinivasan | G08G 5/0021 |

* cited by examiner

*Primary Examiner* — Tyler D Paige
(74) *Attorney, Agent, or Firm* — Kwan & Olynick LLP

(57) ABSTRACT

Systems and methods for autonomous taxi route execution for an aircraft. Clearance communication is received from a ground control station. A plurality of objects is generated from the clearance communication. Next, a context data structure representing a planned taxi route is generated. Last, the planned taxi route is executed.

21 Claims, 14 Drawing Sheets

SYSTEM AND METHOD FOR CLEARANCE-BASED TAXI ROUTE EXECUTION

TECHNICAL FIELD

The present disclosure relates to aircraft systems, and specifically to taxi route execution for the same.

BACKGROUND

Unmanned aircrafts, or drones, are aircrafts without a human pilot on board. An unmanned aircraft is a component of an unmanned aircraft system (UAS); which includes the unmanned aircraft, a ground-based controller, and a system of communications between the two. The flight of unmanned aircrafts may operate with various degrees of autonomy: either under remote control by a human operator or autonomously by onboard computers.

One flight phase that is commonly under remote control by a human operator is the taxiing on a runway. The operator manually defines taxi routes by clicking waypoints on a digital map. However, as with any flight phase, automating the process would lead to a reduction in operation costs and increases in predictability and efficiency. Thus, there is a need for a system and method for autonomous taxi route execution for unmanned aircraft systems.

SUMMARY

The following presents a simplified summary of the disclosure in order to provide a basic understanding of certain examples of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure relates to a system for autonomous taxi route execution for an aircraft, such as an unmanned aircraft. The system comprises a processor and memory. The memory stores instructions to execute a method. The method begins with receiving clearance communication from a ground control station. Next, a plurality of objects is generated from the clearance communication. Then, a context data structure representing a planned taxi route is generated. Last, the planned taxi route is executed.

In some examples, the context data structure includes a route, a clearance command, and one or more hold commands. In some examples, executing the planned taxi route includes causing a vehicle management system to control movement of the aircraft along an input ground path. In some examples, the input ground path is a sequence of waypoints, wherein a waypoint comprises a position on an airport surface, a heading, and a ground speed. In some examples, the clearance command is received at a front end module from the ground control station in text format. In some examples, the front end module interprets the clearance command and determines whether the clearance command contains a taxi or exit command, and if the clearance command contains a taxi or exit command, then the front end module sends the taxi or exit command to a clearance manager module. In some examples, the clearance manager module creates the context data structure using the taxi or exit command. In some examples, after the clearance manager module creates the context data structure, the clearance manager module sends the context data structure to an auto taxi module. In some examples, the auto taxi module includes the scratchpad memory and the active slot, and wherein the auto taxi module operates in three distinct modes: standby, ready, and active.

In some examples, executing the planned taxi route includes computing and recomputing an active leg, the active leg being a current leg that is being executed by the vehicle management system until a hold or stop point is reached. In some examples, during execution of the planned taxi route, upon receiving a cross clearance command, a current hold command is disabled and the active leg is recomputed using a previous leg before the hold command and a following leg after the hold command. In some examples, executing the planned taxi route includes actively listening for on-the-fly hold commands. In some examples, a command clearance command includes an aircraft identifier, an action command, a runway, and one or more taxiways. In some examples, a clearance command is parsed into a clearance object.

In some examples, the planned taxi route is generated via a route planner module, wherein the route planner module generates the planned taxi route using a start position, an abstract destination, an abstract route definition, an airport map, and an aircraft kinetic model. In some examples, the method further includes parsing the clearance communication before generating the plurality of objects from the clearance communication. In some examples, the method further comprises checking the plurality of objects for errors before generating a context data structure representing the planned taxi route. In some examples, executing the planned taxi route includes: storing the context data structure in scratchpad memory; and moving the context data structure into an active slot upon receiving an execute command.

Another aspect of the present disclosure relates yet another system. The system comprises a front end module configured to receive clearance communication from a ground control station. The system also includes a route planner configured to generate a planned taxi route from the clearance communication. The system also includes a clearance manager configured to generate a plurality of objects from the clearance communication, wherein the clearance manager is further configured to generate a context data structure representing the planned taxi route. Last, the system also includes an auto taxi module configured to execute the planned taxi route.

Yet another aspect of the present disclosure relates to a method for executing a planned taxi route. The method begins with receiving a context data structure representing a planned taxi route. Next, the context data structure is stored in scratchpad memory. Then, the context data structure is moved into an active slot upon receiving an execute command. In some examples, the context data structure includes a planned taxi route object, the planned taxi route object including a series of waypoints organized into a set of legs. Last, the method concludes with following each leg until a hold or an end of the planned taxi route is reached. At each hold command, a subset of waypoints corresponding to the next leg is not transmitted to a vehicle management system until the hold command is cleared with a cross command. Once a hold command is cleared, the subset of waypoints corresponding to the next leg is transmitted to the vehicle management system.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The disclosure may best be understood by reference to the following description taken in conjunction with the accompanying drawings, which illustrate particular examples of the present disclosure. In the description that follows, like parts are marked throughout the specification and drawings with the same numerals, respectively. The drawing figures are not necessarily drawn to scale and certain figures may be shown in exaggerated or generalized form in the interest of clarity and conciseness.

DETAILED DESCRIPTION

Figure 1:
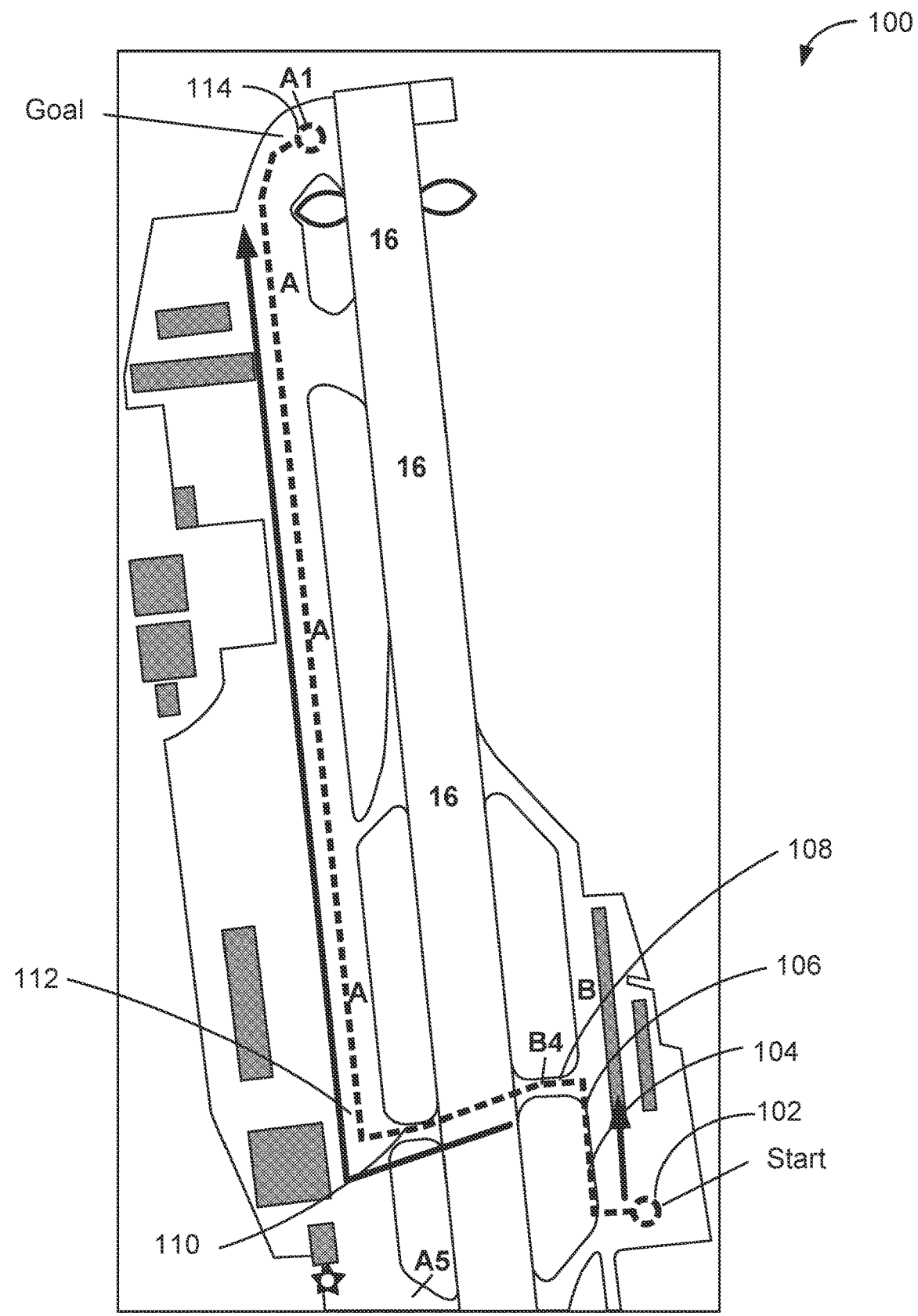
FIG. 1 shows an example of a taxi route, in accordance with examples of the present disclosure.

Reference will now be made in detail to some specific examples of the disclosure including the best modes contemplated by the inventors for carrying out the disclosure. Various examples are illustrated in the accompanying drawings. While the disclosure is described in conjunction with these specific examples, it will be understood that it is not intended to limit the disclosure to the described examples. On the contrary, it is intended to cover alternatives, modifications, and equivalents as may be included within the spirit and scope of the disclosure as defined by the appended claims.

For example, the techniques of the present disclosure will be described in the context of taxi route execution for unmanned aircraft systems. However, it should be noted that the techniques of the present disclosure apply to a wide variety of unmanned vehicle systems, for example, unmanned automobile systems. Further, the techniques of the present disclosure may be applied to manned or piloted aircraft to, for example, offload certain tasks from a human operator. In the following description, numerous specific details are set forth in order to provide a thorough understanding of the present disclosure. Particular examples of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some examples include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

As mentioned above, automating different processes of an aircraft can lead to a reduction in operation costs and increases in predictability and efficiency. In various examples, surface movements of aircraft, such as unmanned aircraft (UAs) are performed through Air Traffic Control (ATC) taxi clearances. Currently, UAs utilize static taxi routes that are pre-approved by ATC. However, such routes require an operator to manipulate a series of waypoints and knobs as the UA is taxiing. To address this deficiency, clearances can be obtained by the ground station operator (GSO) and then subsequently relayed to the aircraft through the ground control station (GCS). If the route planning and taxi execution processes are automated, then the operator simply has to relay the clearances, instead of actually manipulating the aircraft through the way points. Thus, in some examples, the process begins after receiving a clearance command from ATC.

FIG. 1 shows an example of a taxi route, in accordance with examples of the present disclosure. Taxi Route 100 is simply an example taxi route that corresponds to a clearance command received from ATC. The clearance command corresponding to taxi route 100 may be given as follows: "123A, Runway 16 taxi via Bravo, Bravo 4, Alpha 4, Alpha, Alpha 1, hold short of runway 16 on Bravo 4." This taxi clearance identifies the aircraft (123A), and tells the aircraft to taxi to runway 16 via various taxiways, B, B4, A4, and A. The clearance command also tells the aircraft to hold short of runway 16 while on taxiway B4. After the clearance command is received, it is converted into taxi route 100.

Taxi route 100 depicts a start point 102 where aircraft 123A (not shown) starts. The first taxiway the aircraft hits is B ("Bravo") (104). The aircraft will then turn onto the second taxiway B4 at 106. The aircraft will then hold on the intersection of runway 16 and taxiway B4 (108). The aircraft will just hold there until it receives a clear to cross command from ATC. Then the aircraft will cross runway 16 and enter taxiway A4 (110). Once the aircraft reaches taxiway A (112), then it will travel unimpeded until it reaches A1, and then the goal (114) just short of runway 16.

In order to automate the taxi route execution, certain rules of the road need to be followed. First, an aircraft communicates with ATC via Very High Frequency (VHF) on ground frequency. In addition, movement is restricted to "movement areas," which are part of an airport surface where movements are controlled by ATC. These are typically runways and taxiways. Each aircraft needs an initial taxi clearance to enter a movement area on its way to a destination. For example, in the example depicted in FIG. 1, an initial taxi clearance from ATC was needed to enter taxiway B. A taxi clearance defines an abstract route that needs to be interpreted by the pilot/operator with an airport diagram. An aircraft is required to hold at every runway intersection. For example, aircraft 123A was required to hold at the intersection of runway 16 while on taxiway B4. In some examples, a taxi clearance must include, either explicitly or implicitly, "hold" clearances for all runways along the cleared route. Last, an aircraft that is holding needs a "cross" clearance to cross a runway.

Figure 2:
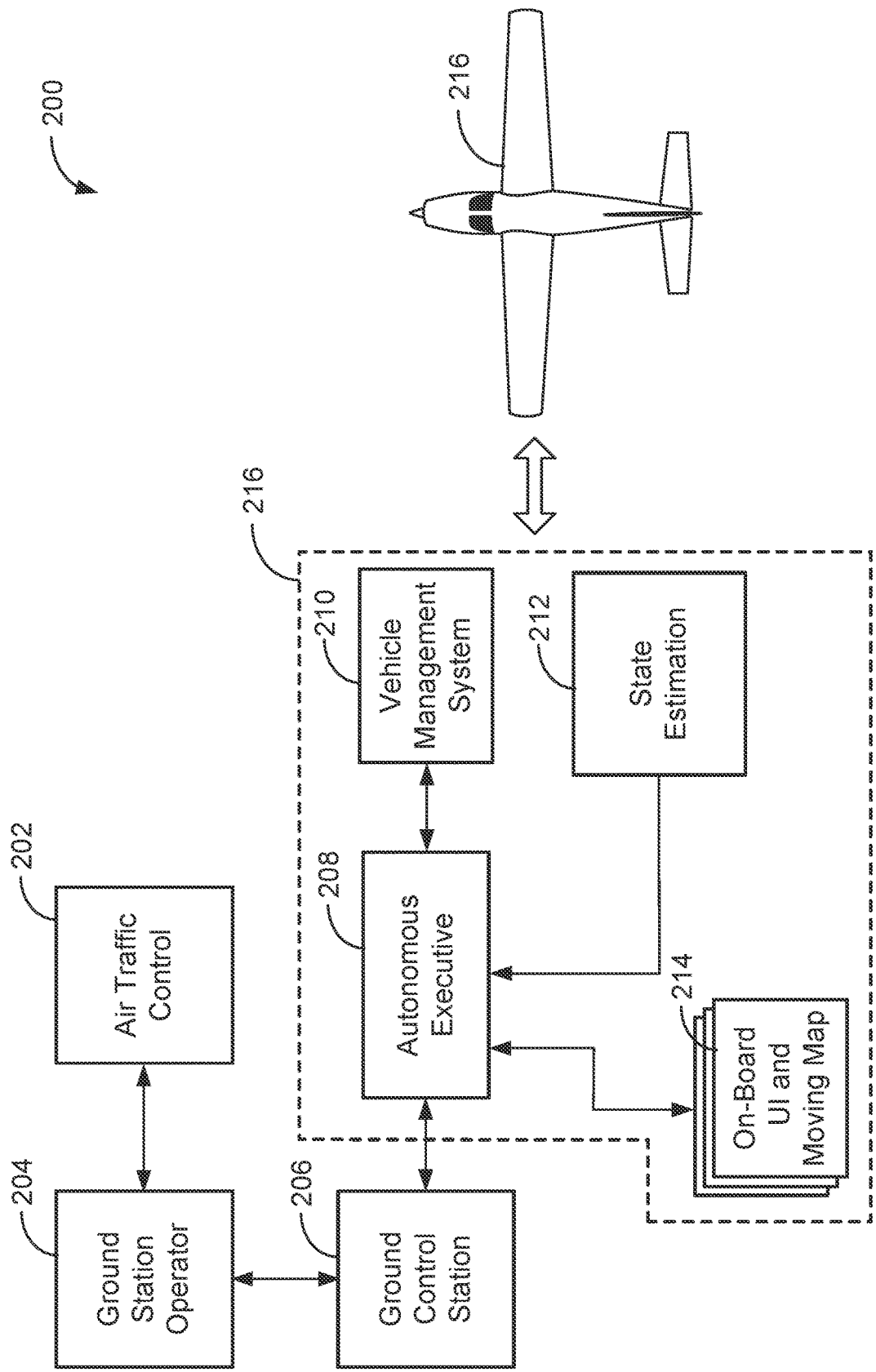
FIG. 2 illustrates a block diagram of an example aircraft, such as an unmanned aircraft system (UAS), in accordance with examples of the present disclosure.

FIG. 2 illustrates a block diagram of an example unmanned aircraft system (UAS), in accordance with examples of the present disclosure. UAS 200 includes ATC 202 that provides the clearances. ATC 202 provides clearance to GSO 204. As mentioned above, the clearances are given in audio format. GSO 204 then transcribes the ATC clearances into GCS 206. GCS 206 transmits the transcribed clearances to autonomous executive (AE) module 208. AE module 208 transforms the clearances into a planned taxi route, along with data objects or data structures that can then be digested by processes to execute the planned taxi route utilizing state estimation module 212. In some examples, state estimation module 212 gives the location of aircraft 216 using GPS.

In some examples, AE module 208 then sends certain messages to vehicle management system (VMS) 210. VMS 210 is responsible for the actual movements of the aircraft. In some examples, VMS 210 is a drive-by-wire system that controls the movement of the aircraft along an input ground path. In some examples, the path is a sequence of waypoints. In some examples, a waypoint comprises 1) a position on an airport surface, typically encoded as latitude and longitude, 2) a heading (or direction that the aircraft is pointed), and 3) a ground speed. In some examples, the waypoint speeds along the path are scheduled or predetermined. In some examples, the waypoint speed schedule is determined by minimizing transit time and observing vehicle dynamic limitations. Further, the last waypoint along the path commands zero speed.

In some examples, AE module 208 also sends the planned taxi route to on-board UI and moving map 214. In some examples, on-board UI and moving map 214 is presented as a graphical user interface (GUI). In some examples, UI and moving map 214 can be helpful for testing purposes by simulating a GCS, and thus may be optional in UAS 200. In some examples, AE module 208, VMS 210, state estimation 212, and on-board UI and moving map 214 are located on an aircraft 216.

Figure 3:
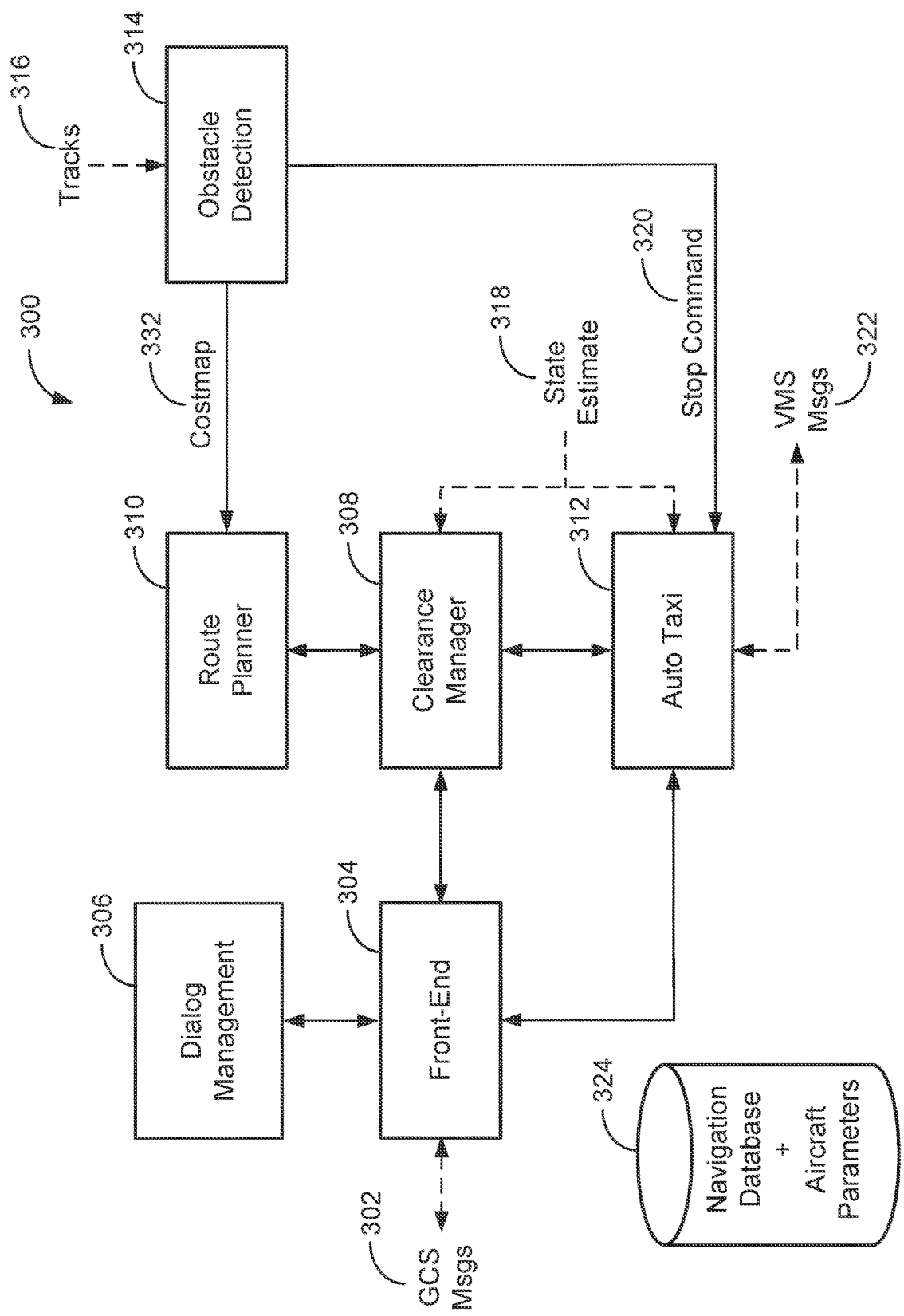
FIG. 3 illustrates a block diagram of functional components of an example autonomous executive module, in accordance with examples of the present disclosure.
Figure 4:
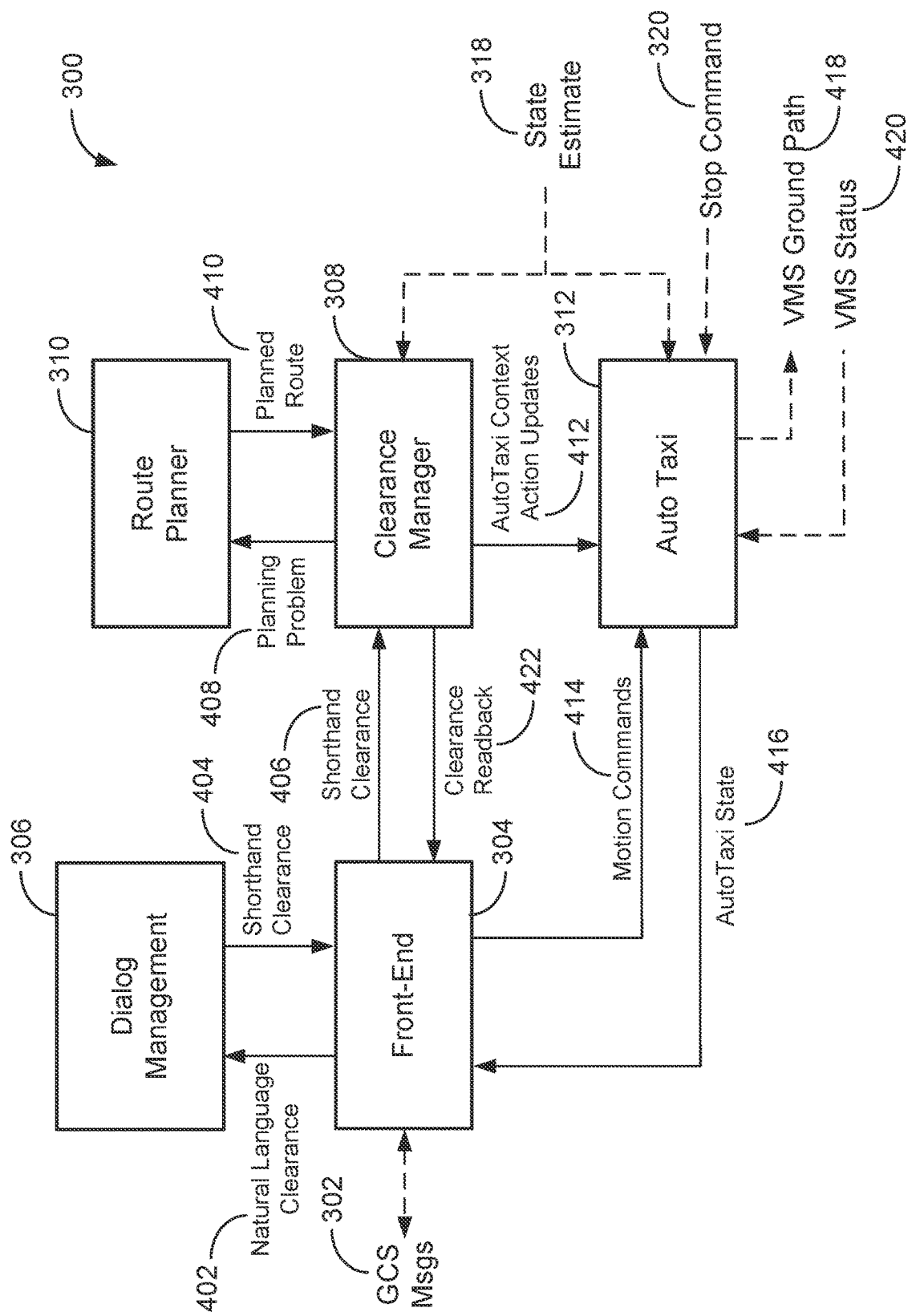
FIG. 4 shows an example of internal message flow in an example autonomous executive module, in accordance with examples of the present disclosure.

FIGS. 3 and 4 illustrate the inner workings of an example autonomous executive module, in accordance with examples of the present disclosure. FIG. 3 illustrates a block diagram of functional components of an AE module, and FIG. 4 shows an example of internal message flow in an AE module.

In some examples, autonomous executive module 300 is responsible converting an ATC clearance into a usable data objects. A GCS message 302 is first received at front-end module 304. Front-end module 304 is responsible for sending GCS message 302 to dialog management module 306 in natural language form 402. In some examples, dialog management module 306 translates ATC clearances, such as GCS message 302, copied verbatim by the GSO into a command-level semantic representation. In addition, in some examples, dialog management module 306 validates that the clearance is intended for the aircraft. In some examples, dialog management module 306 also grounds referents to physical objects, e.g. runways, taxiways, etc. In some examples, dialog management module 306 can also output a confidence metric on the interpretation. Once dialog management module 306 sends back the GCS message 302 in a semantic representation, or "shorthand" form, as shorthand clearance 404, front end module 304 interprets GCS message 302.

In some examples, the GCS will send three different types of commands: 1) clearance commands, 2) movement commands, and 3) housekeeping commands. In some examples, clearance commands include "taxi," "exit," "hold," and "cross." In some examples, these commands can be interpreted as "scheduled" commands for the aircraft to follow. In some examples, front-end module 304 sends clearance commands to clearance manager 308. In some examples, movement commands include "exec," "stop," "halt," and "resume." In some examples, movement commands can be interpreted as "unscheduled" commands for the aircraft to follow. In some examples, front-end module 304 sends movement commands directly to auto taxi module 312. In some examples, housekeeping commands include "init," "reset," and "shutdown." In some examples, housekeeping commands are performed by front-end module 304.

In some examples, front-end module 304 forwards shorthand clearance commands 406 to clearance manager 308. In some examples, clearance manager 308 takes clearance commands 406, sends back a clearance readback 422 to front-end 304, and creates an AutoTaxiContext data structure 412. In some examples, clearance manager 308 maintains a working set of ATC clearances received from GCS. In some examples, the working set includes movement clearances, e.g., "taxi" (format: taxi destination via route) and "exit" (format: exit destination), as well as taxi limits, e.g., "hold" (format: hold taxiway/runway [on taxiway/runway]) and "cross" (format: hold taxiway/runway [on taxiway/runway]) from GCS. In some examples, the working set is initialized with receipt of an initial movement clearance. When the initial movement clearance is received, clearance manager 308 validates the clearance and sends a planning problem 408, using state estimate 318 received from state estimation module 212, to route planner 310.

In some examples, planning problem 408 includes a route definition data structure. In some examples, the route definition data structure includes a current location (given by state estimate 318), a destination by name, and a route defined as a sequence of taxiways listed in the clearance.

Route planner 310 takes planning problem 408 and returns a planned route 410 using costmap 332 received from obstacle detection module 314. In some examples, object detection module 314 processes sensor inputs, fused together in the form of "tracks" 316, of the aircraft for detecting obstacles. It sends costmap 332, which is a distance field that indicates the distance to dynamic obstacles that are not already part of a static environment (e.g., not already listed as an obstacle in an airport map). In some examples, object detection module 314 can also issue stop command 320 to Auto Taxi module 312, if, for example, it detects a new obstacle along the path. Planned route 410, which is a data structure itself, is then used by clearance manager 308 to construct an AutoTaxiContext data structure 412.

According to various examples, AutoTaxiContext data structure 412 is an overarching data structure that contains all the data necessary for executing planned route 410. In some examples, it contains planned route 410, as well as objects that represent all the information in GCS message 302. AutoTaxiContext datastructures will be further explained with more detail in FIGS. 7 and 8. Once AutoTaxiContext data structure 412 is created, it is sent to Auto Taxi module 312 for planned route execution. Auto Taxi module 312 uses the AutoTaxiContext data structure 412 and controls the movement of the aircraft by sending VMS messages 322 to VMS 210. In some examples, a VMS message 322 can take the form of a VMS ground path 418, which is a series of waypoints. Auto Taxi module 312 monitors the motion of the aircraft using state estimate 318 and VMS status 420, received from VMS 210. In some examples, Auto Taxi module 312 also sends a status message in the form of Auto Taxi State 416 to front-end 304 to be translated and relayed back to GCS 206.

As previously mentioned, front-end module sends motion commands 414 directly to auto taxi module 312. These motion commands are "unscheduled" and can actually override "scheduled" command movement caused by clearance commands.

According to various examples, each module listed in autonomous executive module 300 has access to navigation database and aircraft parameters 324. The navigation database includes maps, such as airport maps, that allow autonomous executive 300 to plan the route and execute the same. Navigation database 324 can also be used in conjunction with state estimate 318 to automatically select an active airport map, based on the aircraft's location. Aircraft parameters are also necessary for planning the route and for executing the route because they define the limits of the aircraft movements, including the speed, turning radius, breaking distance, and the size of the aircraft.

Figure 5:
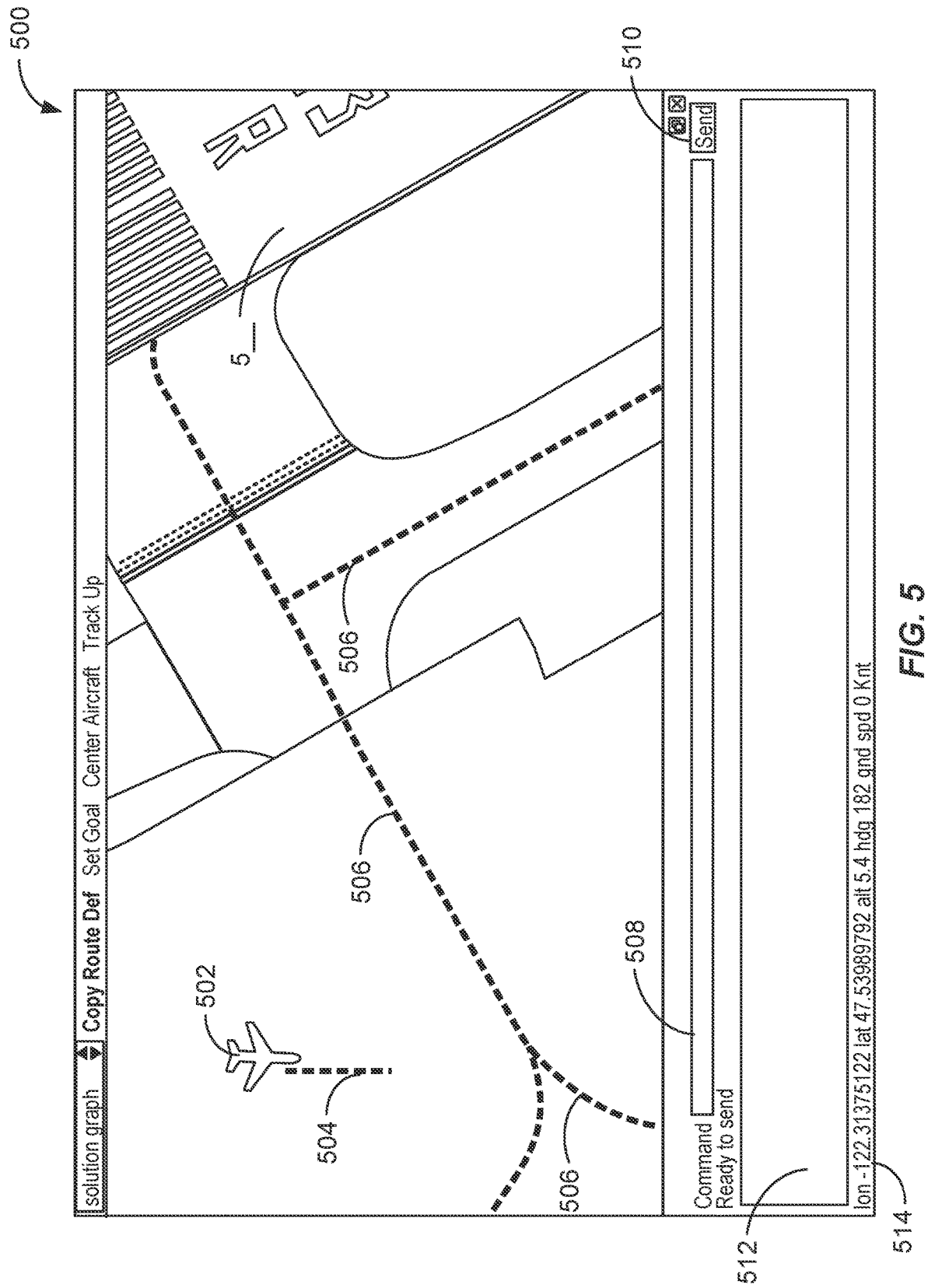
FIG. 5 shows a diagram of one example of an onboard user interface (UI) showing a moving map, in accordance with examples of the present disclosure.

FIG. 5 shows a diagram of one example of an onboard user interface (UI) display showing a moving map, in accordance with examples of the present disclosure. UI display 500 provides an example representation of what a GCO can see, information wise. Aircraft 502 is shown on display 500 at the top left of the display. Taxiway 504 represents a taxi line for a parking area, which is why it is shown as disjointed on display 500. The longer dotted lines are taxiway center lines 506. Centerlines, or guidelines, are preferred "lines" painted on an airport surface, based on international standards, to follow for taxiing purposes. When navigating, there are cases where an aircraft deviates from the centerline (e.g., when turning around or parking), but most of the time an aircraft stays on the centerline when taxiing. This is important in autonomous navigation because it leads to predictable behavior.

UI display 500 includes a command line for a GCO to type in ATC clearance commands to the AE. Once the command is ready to be sent, the GCO can press the send button 510. AE status box 512 displays all status messages relayed by AE to GCS. Underneath AE status box 512 is the state estimate line 514 which displays the current location information of aircraft 502.

Figure 6:
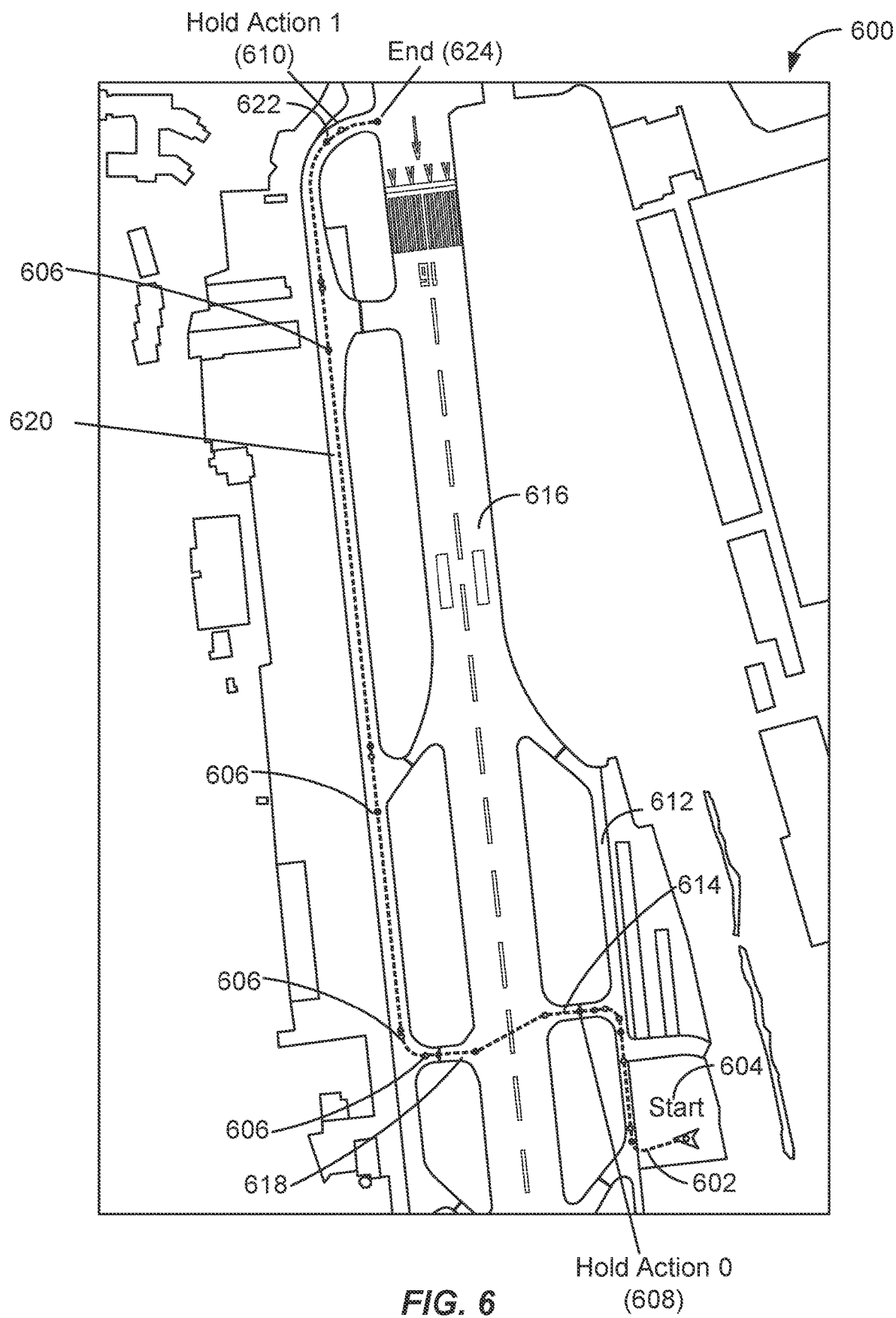
FIG. 6 shows a map representation of an auto taxi context data structure, in accordance with examples of the present disclosure.

FIG. 6 shows a map representation of an auto taxi context data structure, in accordance with examples of the present disclosure. Map representation 600 includes a planned route 602 corresponding to the taxi clearance "Taxi 16 via B B4 A4 A." An aircraft (not shown) can start following planned route 602 beginning at start point 604, given by the state estimate. The aircraft can then follow the dotted path demarcated by a series of waypoints 606. The aircraft first enters taxiway B (612), then turns into taxiway B4 (614). Once the aircraft reaches the intersection of runway 16 (616) while on B4, a "hold" 608 (caused by a "hold action 0" object) will cause the aircraft to stop. The aircraft will not proceed any further along route 602 if a cross clearance is not received. Once a cross action is received, then the aircraft cross runway 16 (616) and enters taxiway A4 (618). The aircraft then turns into taxiway A (620) and moves along taxiway A (620) until it finally turns into taxiway A1 (622). There, another "hold" 610 (caused by a "hold action 1" object) will cause the plane to stop until another cross clearance is received. After a cross clearance is received, the aircraft can then proceed to its goal 624.

Figure 7:
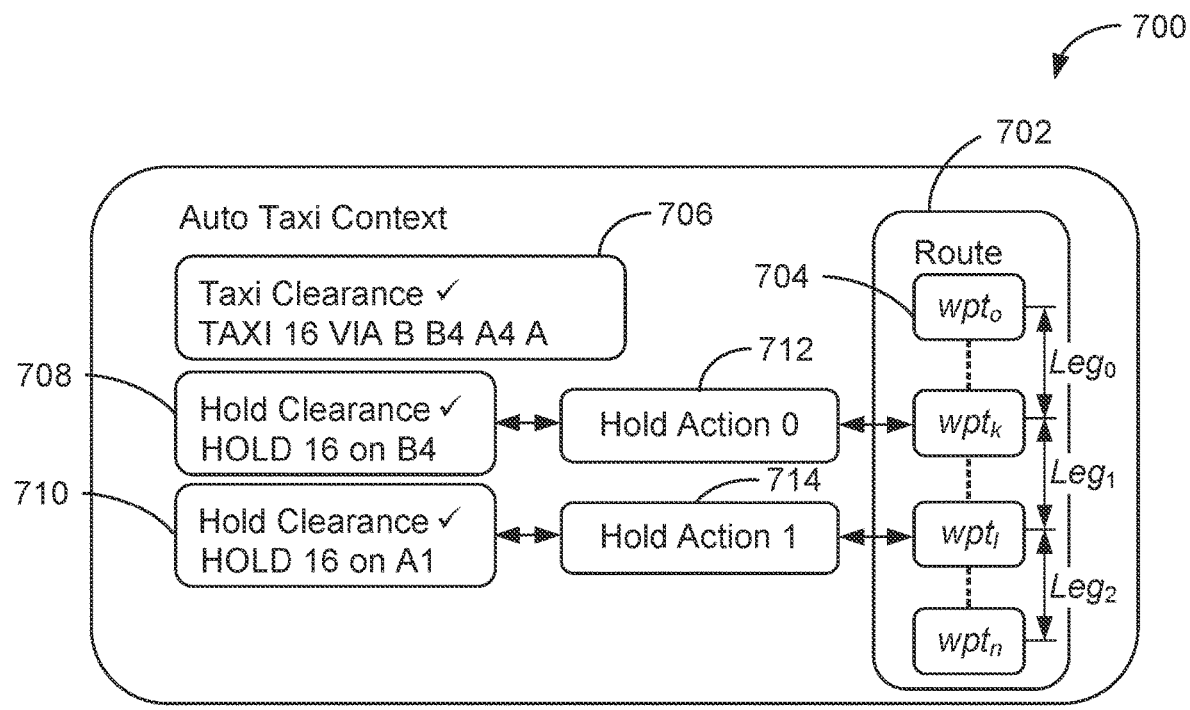
FIG. 7 shows an example of an auto taxi context data structure, in accordance with examples of the present disclosure.

FIG. 7 shows an example of an auto taxi context data structure, in accordance with examples of the present disclosure. Auto taxi context data structure 700 stores the data corresponding to map representation 600. Auto taxi context data structure 700 includes a route 702, which is itself a data structure holding a series of way points organized into a set of "legs" for the route. A "leg" is made up of one or more waypoints and represents an uninterrupted movement along the path. Each leg ends in either a hold or the end of the route. Route 702 includes three legs. $Leg_0$ includes the starting way point, $wpt_0$ (corresponds to the starting position of the aircraft), and ends at $wpt_k$. $Leg_1$ starts at $wpt_k$ and ends at $wpt_1$. Last, $leg_2$ starts at $wpt_1$ and ends at $wpt_n$, which is the end point of the route. Each waypoint 704 is represented as an object itself, storing information regarding location, heading, and speed. In some examples, the speed in each waypoint is used to calculate the transit time for the overall route, but may differ from the actual speed during execution of the route.

Auto taxi context data structure 700 also includes a clearance object 706 that contains the information for the clearance command from ATC. In some examples, clearance object 706 is for reference purposes and to label the auto taxi context data structure 700. Auto taxi context data structure 700 also includes two hold clearance objects 708 and 710. Hold clearance 708 represents a hold at the intersection of runway 16 on taxiway B4. Hold clearance 710 represents a hold at the intersection of runway 16 on taxiway A1. Each hold clearance object links to a hold action objection. Hold clearance 708 is linked to hold action 0 object 712, which is then linked to $wpt_k$. Hold clearance 710 is linked to hold action 1 object 714, which is then linked to $wpt_1$.

Figure 8:
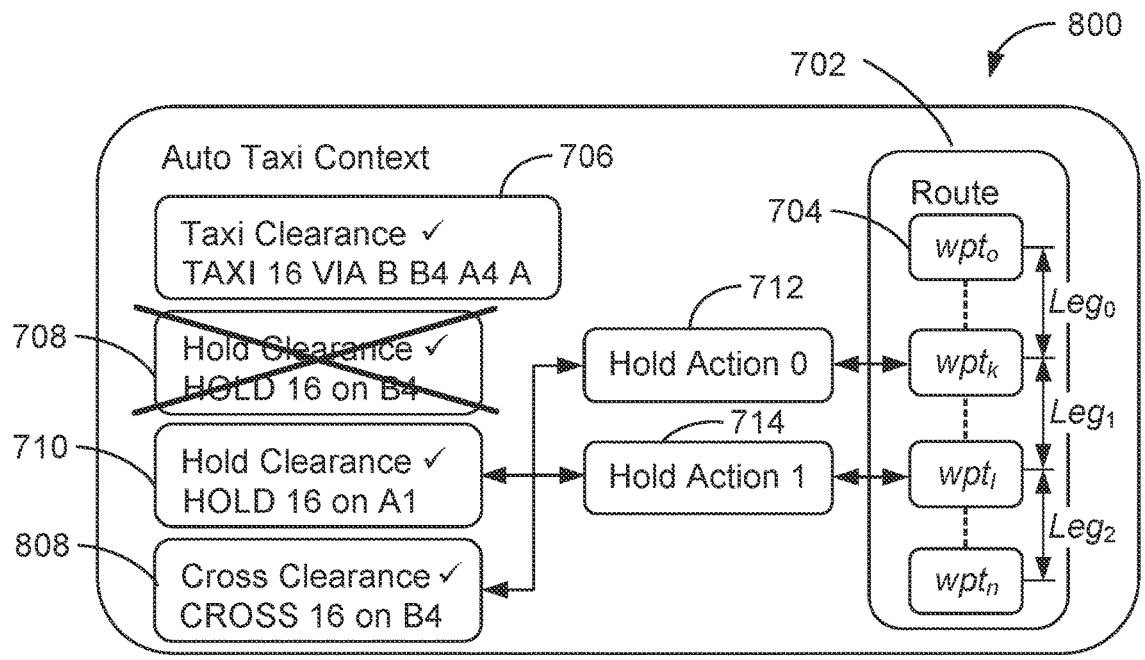
FIG. 8 shows an example of how an auto taxi context data structure changes as a living document, in accordance with examples of the present disclosure.

As mentioned above, clearance manager 308 maintains a working set of ATC clearances. That means new ATC clearances will be received by the AE from GCS, as in the case of cross clearances. FIG. 8 shows an example of how an auto taxi context data structure changes as a living document, in accordance with examples of the present disclosure. Auto taxi context data structure 800 is a revised version of auto taxi context data structure 700. Everything in auto taxi context data structure 800 is the same as auto taxi context data structure 700 except that cross clearance 808 has been added in place of hold clearance 708. Cross clearance 808 represents a cross clearance received from GCS to instruct the aircraft to cross runway 16 while on taxiway B4. The new clearance object "takes over" hold action 0 object 712. In other words, clearance manager 308 removes the link between hold clearance 708 and hold action 0 object 712 and then establishes a new link between cross clearance 808 and hold action 0 object 712. In some examples, each hold action object has an internal state, e.g., a flag, which can be set or unset. If a hold clearance object is linked to a hold action object, the internal state is activated, meaning the "hold action" becomes active. If a cross clearance object connects to the hold action object, then the internal state is deactivated, meaning the "hold action" becomes inactive. When a hold action object is inactive, the aircraft can resume taxiing.

The clearance manager 308 receives clearances from GCS 206 (via front-end 304) and generates auto taxi data structures 700 and 800. Once an auto taxi data structure is generated, it is then sent to auto taxi module 312. Auto taxi module 312 executes the auto taxi data structures by sending VMS messages to VMS 210 while in different states.

Figure 9:
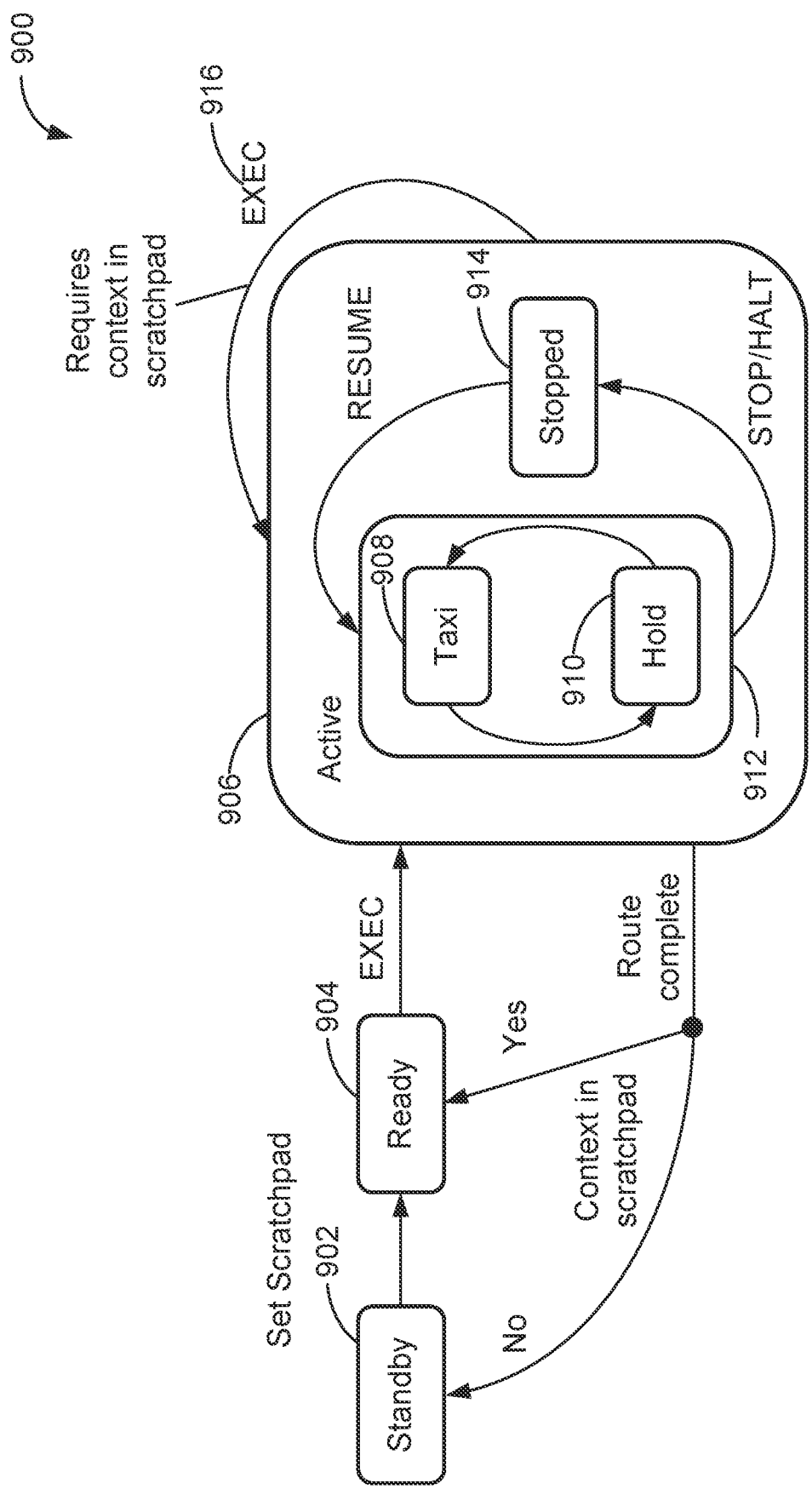
FIG. 9 shows a flowchart of a planned route execution in an auto taxi module, in accordance with examples of the present disclosure.

FIG. 9 shows a flowchart of a planned route execution in an auto taxi module, in accordance with examples of the present disclosure. Auto taxi module 312 has a scratchpad context and an active context. In addition, auto taxi module state diagram 900 shows three different overarching states for auto taxi module 312: standby state 902, ready state 904, and active state 906.

When there is no auto taxi context data structure in either the scratchpad context or active context, then auto taxi module 312 is in standby state 902. Once an auto taxi context data structure is received, it is first moved into scratchpad memory. If the scratchpad contains an auto taxi context data structure, then auto taxi module 312 is in ready state 904. Here auto taxi module 312 waits to receive an "exec" command from GCS. For example, a GCO can enter "exec" into command line 508 in on-board UI 500 and press send button 510. Once the "exec" command is received, the auto taxi context data structure is moved into the active slot and auto taxi module 312 enters active state 906.

Active state 906 has sub-states within the state itself. When auto taxi module 312 first moves into active state 906, it immediately enters the taxi sub-state 908. While in taxi sub-state 908, auto taxi module 312 generates the "active" leg, or the leg that the aircraft is currently on, in the route. Once the active leg, represented by a series of way points, is generated, it is sent to the VMS in the form of a VMS ground path. In the example illustrated in FIGS. 7 and 8, the initial active leg is $leg_0$, which is the set of way points $wpt_0$ to $wpt_k$. For the purposes of this disclosure, the VMS is assumed to be "hot" or always live and ready, meaning as soon as the VMS receives a way point, it will start moving. Once the aircraft reaches the last waypoint in the leg, which should have a speed of zero, the aircraft automatically comes to a stop. At this point, auto taxi module 312 goes into hold sub-state 910. Auto taxi module 312 will remain in hold sub-state 910 until a cross clearance object has been received by clearance manager 308. Once a clearance object is received and the auto taxi context data structure is updated, then auto taxi module 312 once again enters the taxi state and recomputes the active leg.

In some examples, auto taxi module 312 monitors the movement of the aircraft using state estimate 318 and VMS status messages 420. Thus, it will know to enter hold sub-state 910 when the aircraft reaches waypoint $wpt_k$. In some examples, auto taxi module 312 is also constantly listening for new updates from clearance manager 308. Sometimes, a cross clearance is received by the AE before the aircraft reaches the hold waypoint. For example, if a cross clearance for runway 16 on taxiway B4 is received and processed by clearance manager 308 and sent to auto taxi 312 while the aircraft was only on waypoint $wpt_d$ of $leg_0$ (remember that $leg_0$ in the example consists of waypoints $wpt_0$ to $wpt_k$), then auto taxi module 312 recomputes/regenerates the active leg which now becomes the set of waypoints from $wpt_e$ (the next waypoint after $wpt_d$) to waypoint $wpt_1$, the next hold waypoint. In such a case, the preemptive clearance allows auto taxi module 312 to recompute the active leg on-the-fly and the aircraft would not stop at runway 16, but instead will proceed to immediately cross the runway upon reaching the intersection.

Auto taxi module 312 can keep cycling between the two sub-states 908 and 910 until it reaches the end of the route. Once the route is complete, auto taxi module 312 reverts back to either standby state 902, or ready state 904, depending on whether there is another auto taxi context data structure waiting in scratchpad memory.

The taxi and hold sub-states 908 and 910 correspond to "scheduled" clearance commands. Thus, taxi and hold sub-states 908 and 910 can be referred collectively as "scheduled" sub-states 912. However, occasionally, ATC will issue "unscheduled" movement commands, such as "pause" or "stop". Such commands will be received by the GCO, which will then send "stop," "halt," and "resume" commands to the AE. The "stop" and "halt" commands instruct auto taxi module 312 to make an unscheduled stop. "Halt" is basically the same as "stop," except with a shorter stopping distance. In other words, a "halt" command means "stop faster." For example, if a "stop" command has a predefined deceleration speed of 1 m/s$^2$, then a "halt" command can have a corresponding predefined deceleration speed of 2 m/s$^2$. Last, a "resume" command means to proceed after any stop/halt command.

As previously mentioned, motion commands from the GCS are received by front end 304 and forwarded to auto taxi module 312 directly. Motion commands have the ability to supersede or override "scheduled" movements. Thus, motion commands can effectively kick the auto taxi module into another sub-state that is super to "scheduled" sub-states 912. More specifically, when auto taxi module 312 receives a "stop" or "halt" command, auto taxi module 312 moves from the scheduled sub-states 912 into a "stopped" sub-state 914. "Stopped" sub-state 914 is "unscheduled." When auto taxi module 312 receives a "resume" command, it will revert back to one of the "scheduled" sub-states 912. Thus, auto taxi module 312 can be described as switching back and forth between "scheduled" and "unscheduled" sub-states, while in the "active" state 906. In some examples, a "stop" or a "halt" command can override any "scheduled" sub-state 912. Thus, even if the aircraft is already stopped due to a "hold" command, auto taxi module 312 will still exit "hold" sub-state 910 and move into "stopped" sub-state 914. In other words, a "stop" command can preempt a "hold" command. That means that even if auto taxi module 312 receives a "cross" command, the aircraft will not move because it is currently in the "stopped" sub-state 914. Only when auto taxi module 312 receives a "resume" movement command will it move back into a scheduled sub-state 912. In the case of receiving a "cross" clearance command while in the "stopped" sub-state 914, a "resume" will bring auto taxi module 312 back into "taxi" sub-state 908. If the "stop" command occurred during a hold but a "cross" command was never received, auto taxi module 312 moves from "stopped" sub-state 914 directly back into "hold" sub-state 910.

In some examples, auto taxi module 312 is configured to switch auto taxi context data structures on-the-fly. This usually represents a clearance command from ATC to switch to a new route. In such cases, a new auto taxi context data structure must already be in scratchpad memory. Then, when GCO sends an "exec" command 916, then then new auto taxi context data structure is moved from scratchpad memory into the active slot, directly into "taxi" sub-state 908. Auto taxi module 312 will then proceed to compute the active leg for the new route. In some examples, one condition for switching routes is that the new route has to coincide with current location on the current route. For example, if the current location of the aircraft, given as the state estimate, is nowhere on the current route, then auto taxi module 312, or any of the AE modules, will reply back with an error message.

Figure 10A:
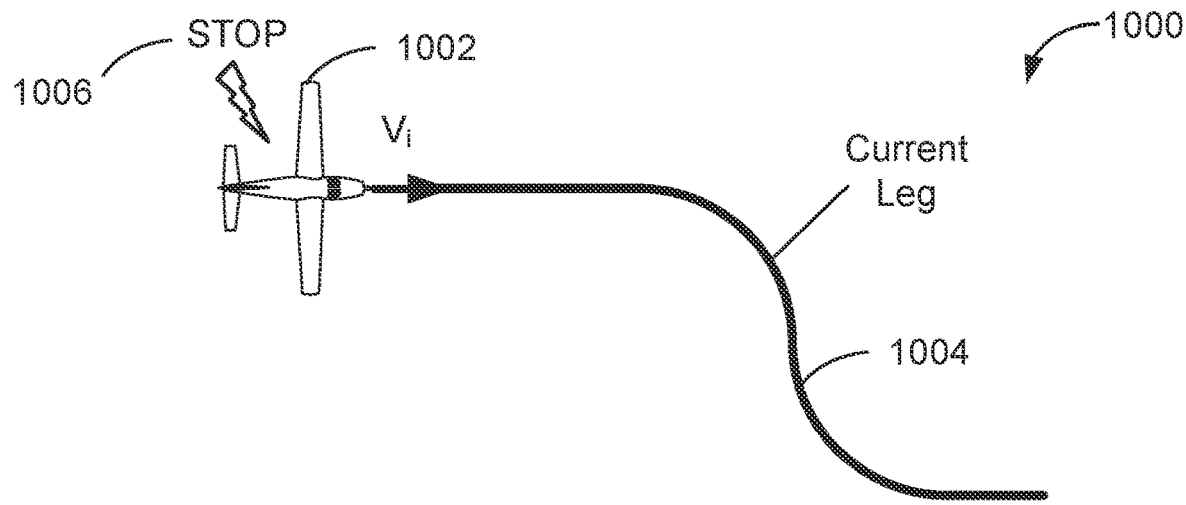
FIGS. 10A-10C show one example of processing of a stop/halt command, in accordance with examples of the present disclosure.
Figure 10B:
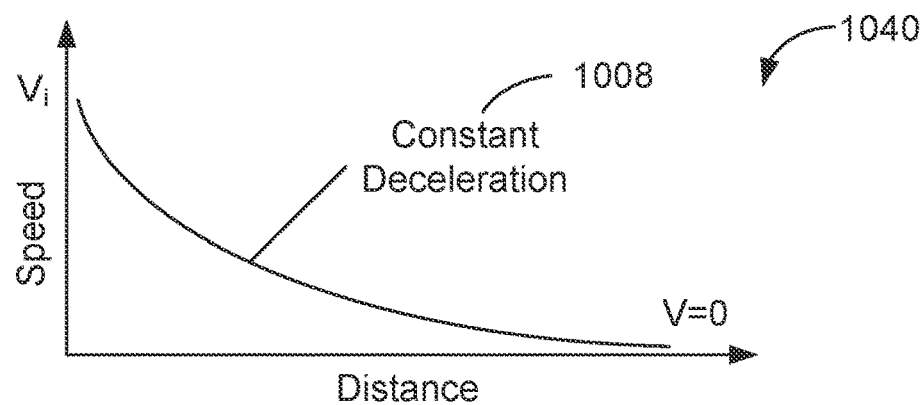
Figure 10C:
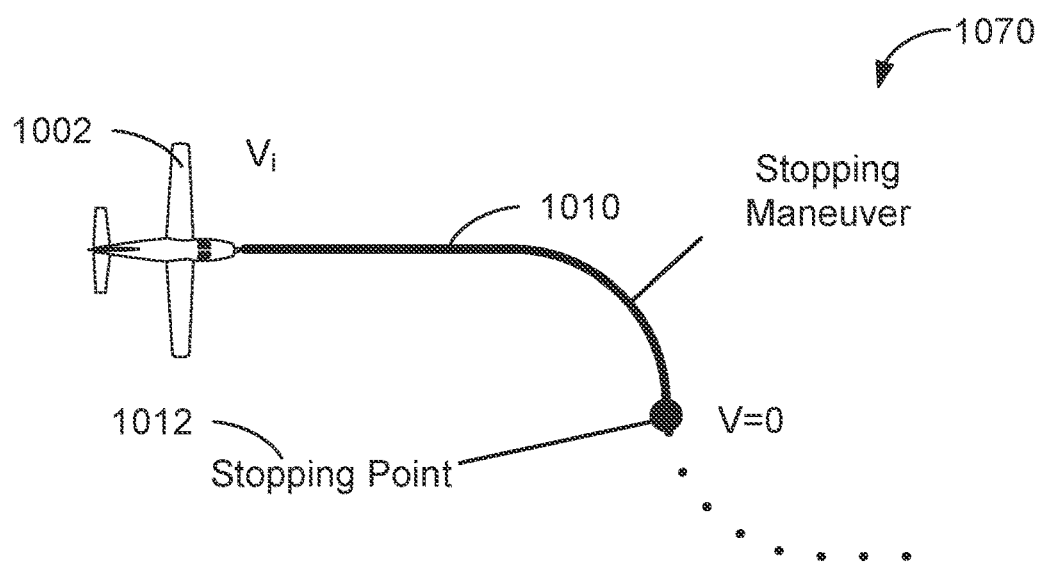

As previously mentioned, a "stop" command will cause the aircraft to stop along the route. In some examples, processing a "stop" command includes auto taxi module 312 actually sending a "stop" maneuver to VMS. Since the VMS is always assumed to be hot and ready to go, then a "stop" maneuver can consist of an updated series of waypoints or an updated VMS ground path. The updated waypoints in a "stop" maneuver usually contain less waypoints then the current active leg. In some examples, a "stop" maneuver contains just enough waypoints to constitute a minimum breaking distance for the aircraft, given predetermined deceleration rates for "stop" and "halt" commands and the current speed of the aircraft. In some examples, since waypoints are spaced evenly apart, the actual stopping point corresponding to the minimum breaking distance for the aircraft can fall somewhere in between regularly spaced waypoints. In such examples, a new stopping waypoint is inserted at the "in between" point. It is important to note that since waypoints have an associated speed, a series of waypoints with progressively descending speeds effectively results in deceleration of a plane. FIGS. 10A-10C illustrate how a stop maneuver is processed.

FIGS. 10A-10C show one example of processing of a stop/halt command, in accordance with examples of the present disclosure. FIG. 10A illustrates a visual diagram 1000 of aircraft 1002, with an initial speed $V_i$, traveling along current leg 1004, when it receives "stop" command 1006. FIG. 10B illustrates a graph 1040 of speed (y-axis) as a function of distance (x-axis). The curvature of the graph, with a constantly changing slope from speed $V_i$ to V=0, shows a constant deceleration 1008. FIG. 10C illustrates a visual diagram 1070 showing aircraft 1002 traveling along the updated active leg 1010, which constitutes the stopping maneuver, which ends at a new stopping point 1012.

Figure 11:
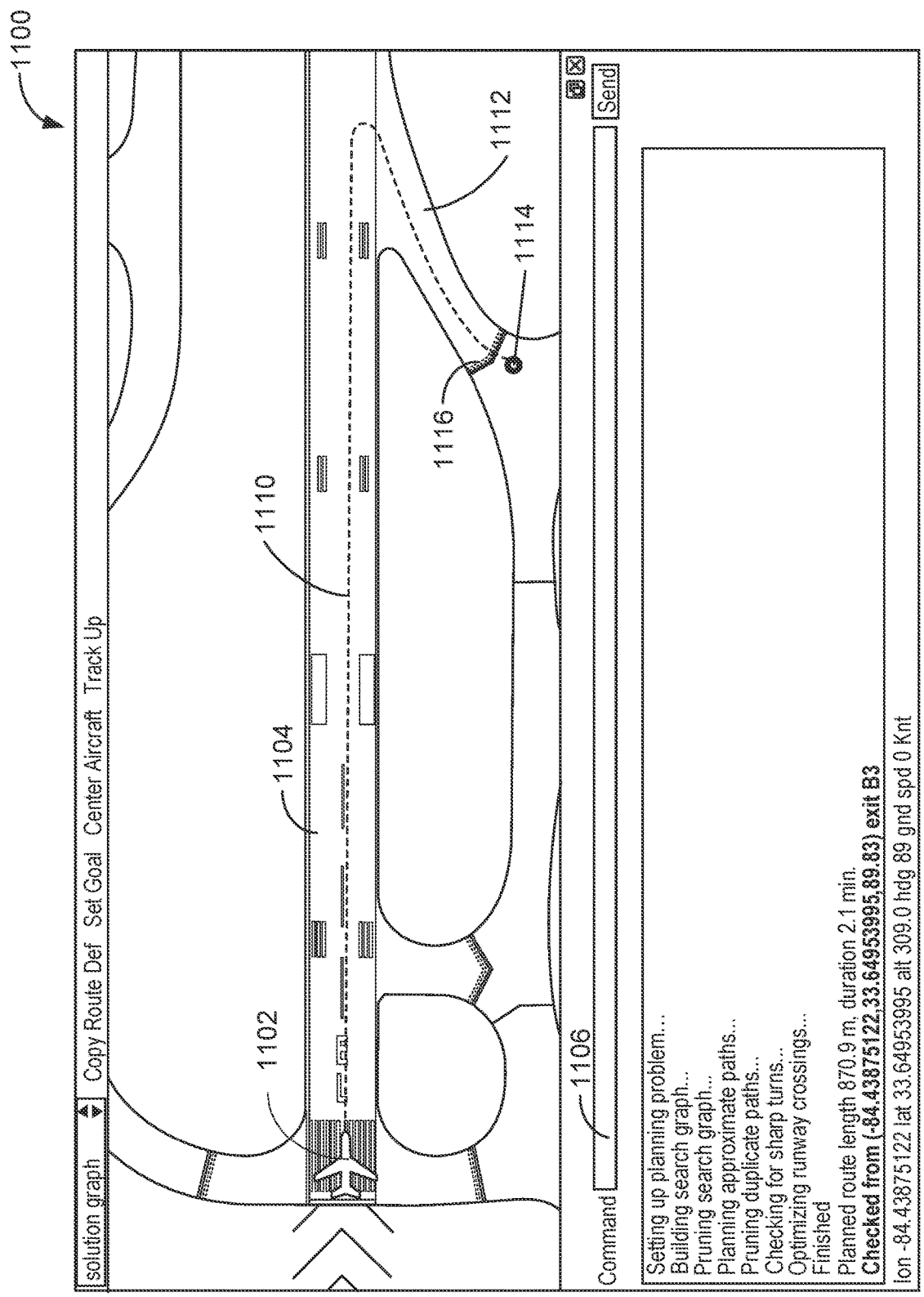
FIG. 11 shows an example of a UI display depicting an exit clearance, in accordance with examples of the present disclosure.

Methods for processing movement commands ("exec," "stop," "halt," and "resume"), as well as some clearance commands ("taxi," "hold," and "cross") have been described in detail above. FIG. 11 illustrates a special clearance command called "exit." An "exit" clearance command is given in the form "exit" taxiway. It only occurs if an aircraft is already on a runway, e.g., runway 16, and the GCO instructs the aircraft to exit the runway. Once the AE receives the "exit" command, it checks to see if the taxiway listed in the command is actually connected to the runway (perhaps using navigation database 324), then proceeds to execute the taxi command in the manner similar the processes described above. The only difference with executing an "exit" command is that for each particular exit route, each taxiway has a "hold" line that the aircraft has to taxi beyond in order to be considered to have legally exited the runway.

FIG. 11 shows an example of a UI display depicting an exit clearance, in accordance with examples of the present disclosure. GUI/display 1100 illustrates aircraft 1102 already sitting on runway 1104. Once an "exit" command is typed into command line 1106 and sent using button 1108, then the AE validates the "exit" command, accepts it, then generates an exit route 1110 through taxiway 1112. It is important to note that the stopping point 1114 for route 1110 is past "hold" line 1116 on taxiway 1112. Only when aircraft 1102 reaches stopping point 1114 past "hold" line 1116, is the aircraft 1102 considered to have legally exited runway 1104.

Figure 12:
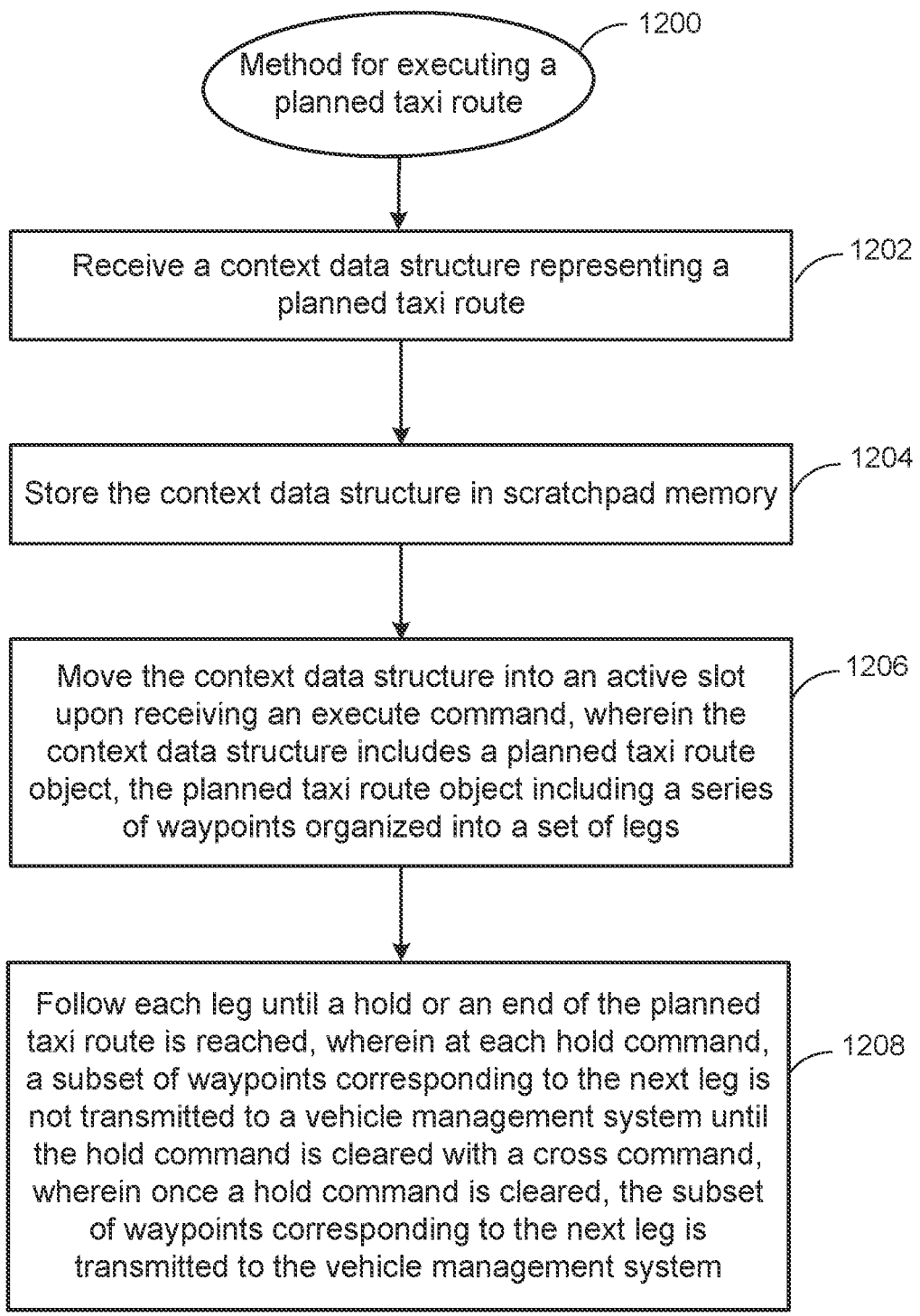
FIG. 12 shows a flowchart of a method for executing a planned taxi route, in accordance with examples of the present disclosure.

FIG. 12 shows a flowchart of a method 1200 for executing a planned taxi route, in accordance with examples of the present disclosure. Method 1200 can be executed by a processor and memory. Method 1200 begins with receiving (1202) a context data structure representing a planned taxi route. In some examples, this data structure is similar to the auto taxi context data structure described in FIGS. 7 and 8. At 1204, a context data structure is stored in scratchpad memory. In some examples, this scratchpad memory is similar to the scratchpad memory of auto taxi module 312, as described with reference to FIG. 9. At 1206, the context data structure is moved into an active slot upon receiving an execute command. In some examples, this active slot is similar to the active slot of auto taxi module 312, as described with reference to FIG. 9. In some examples, the context data structure includes a planned taxi route object, the planned taxi route object including a series of waypoints organized into a set of legs. In some examples, the planned taxi route object is similar to route object 702 in FIGS. 7 and 8. At 1208, each leg is followed until a hold or an end of the planned taxi route is reached. In some examples, this is equivalent to recomputing the active leg in the taxi state, as described above with reference to FIG. 9. In some examples, at each hold command, a subset of waypoints corresponding to the next leg is not transmitted to a vehicle management system until the hold command is cleared with a cross command. In some examples, this is similar to auto taxi module 312 being in the "hold" sub-state 910 as shown in FIG. 9. In some examples, once a hold command is cleared, the subset of waypoints corresponding to the next leg is transmitted to the vehicle management system. In some examples, this is similar to recomputing the active leg once auto taxi module 312 moves back into the "taxi" sub-state 908 as show in FIG. 9.

Figure 13:
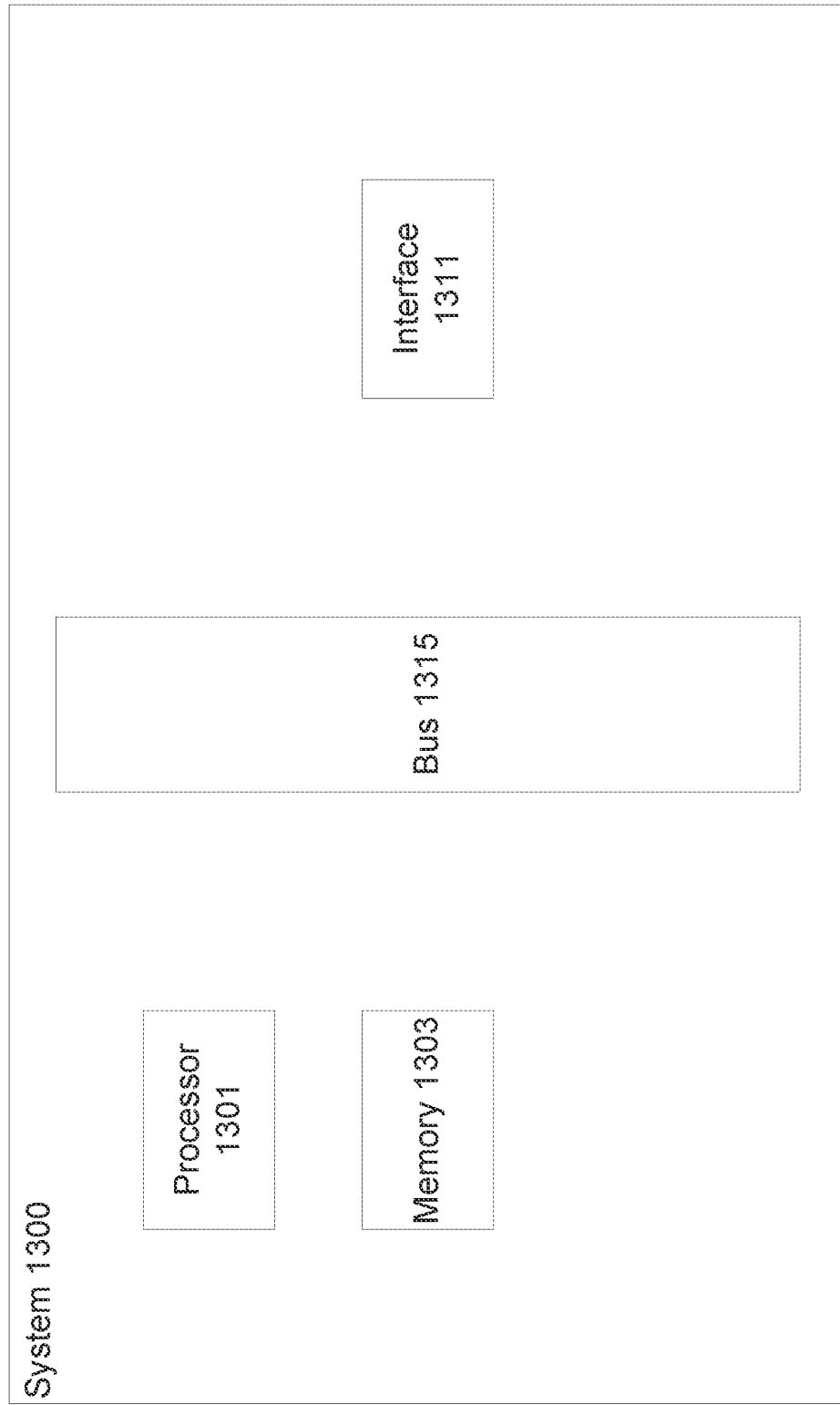
FIG. 13 illustrates a block diagram of an example of a system capable of implementing various processes described herein, in accordance with one or more examples of the present disclosure.

FIG. 13 is a block diagram illustrating an example of a system 1300 capable of implementing various processes described in the present disclosure. According to particular examples, a system 1300, suitable for implementing particular examples of the present disclosure, includes a processor 1301, a memory 1303, an interface 1311, and a bus 1315 (e.g., a Peripheral Component Interconnect (PCI) bus or other interconnection fabric) and operates as a streaming server. In some examples, when acting under the control of appropriate software or firmware, the processor 1301 is responsible for the various steps described in any method described herein. Various specially configured devices can also be used in place of a processor 1301 or in addition to processor 1301. In other examples, system 1300 may also include one or more of the following elements: a pump, a timing element, a heating element, a thermostat, and a concentration detector.

The interface 1311 is typically configured to send and receive data packets or data segments over a network. Particular examples of interfaces supports include Ethernet interfaces, frame relay interfaces, cable interfaces, Digital Subscriber Line (DSL) interfaces, token ring interfaces, and the like. In addition, various very high-speed interfaces may be provided such as fast Ethernet interfaces, Gigabit Ethernet interfaces, Asynchronous Transfer Mode (ATM) interfaces, High Speed Serial (HSS) interfaces, Point of Sale (POS) interfaces, Fiber Distributed Data (FDD) interfaces and the like. Generally, these interfaces may include ports appropriate for communication with the appropriate media. In some cases, they may also include an independent processor and, in some instances, volatile Random Access Memory (RAM). The independent processors may control such communications intensive tasks as packet switching, media control and management.

According to particular example examples, the system 1300 uses memory 1303 to store data and program instructions for operations. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, or non-transitory, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Examples of Aircraft and Methods of Fabricating and Operating Aircraft

Figure 14:
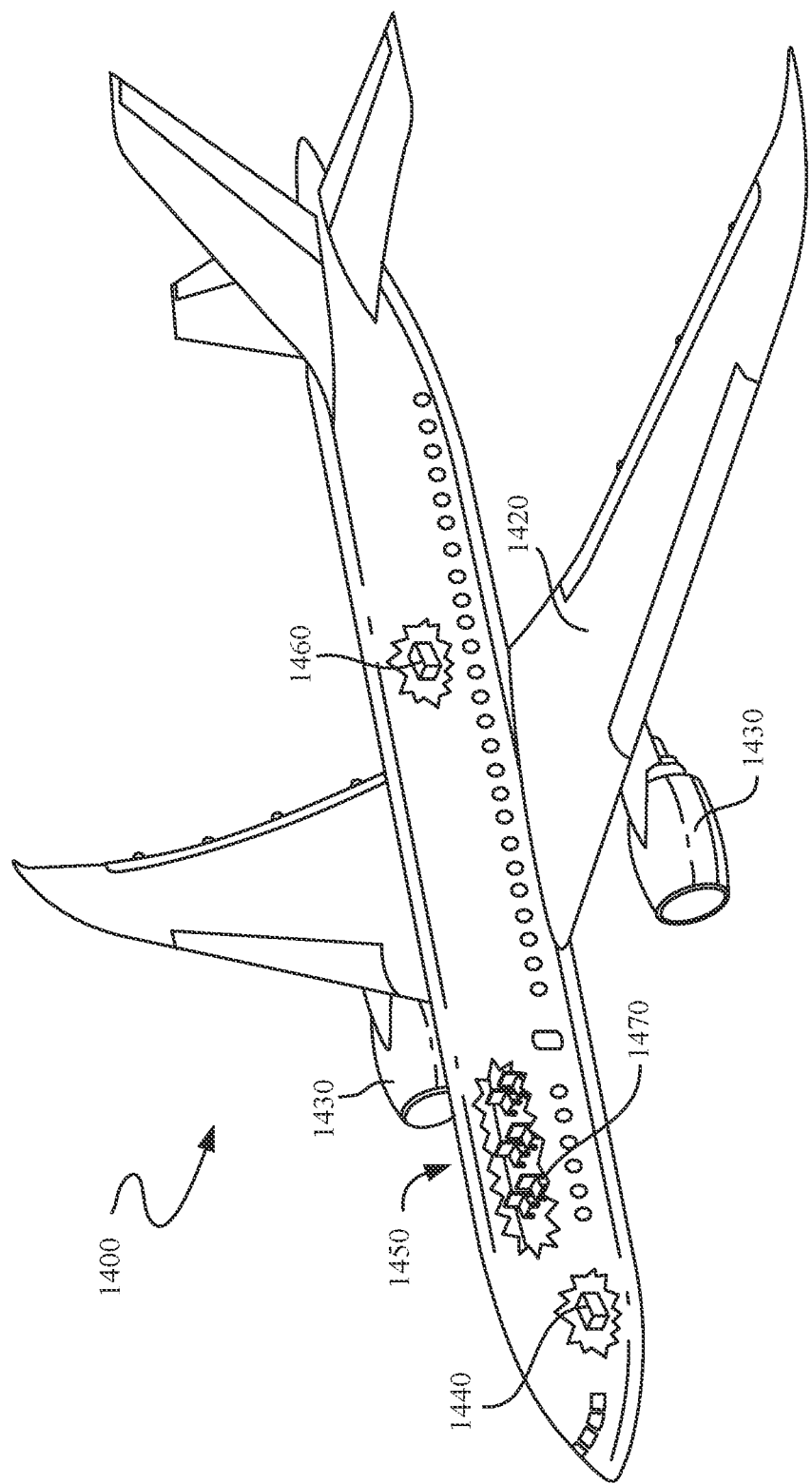
FIG. 14 illustrates a schematic illustration of an aircraft, in accordance with one or more examples of the present disclosure.

To better understand various aspects of implementation of the described systems and techniques, a brief description of an aircraft and aircraft wing is now presented. FIG. 14 is a schematic illustration of aircraft 1400, in accordance with some examples. As depicted in FIG. 14, aircraft 1400 is defined by a longitudinal axis (X-axis), a lateral axis (Y-axis), and a vertical axis (Z-axis). In various examples, aircraft 1400 comprises airframe 1450 with interior 1470. Aircraft 1400 includes wings 1420 coupled to airframe 1450. Aircraft 1400 may also include engines 1430 supported by wings 1420. In some examples, aircraft 1400 further includes a number of high-level inspection systems such as electrical inspection system 1440 and environmental inspection system 1460. In other examples, any number of other inspection systems may be included.

Aircraft 1400 shown in FIG. 14 is one example of a vehicle of which components may be utilized with the disclosed systems and/or devices, in accordance with illustrative examples. Although an aerospace example is shown, the principles disclosed herein may be applied to other industries, such as the automotive industry. Accordingly, in addition to aircraft 1400, the principles disclosed herein may apply to other vehicles, e.g., land vehicles, marine vehicles, space vehicles, etc.

Figure 15:
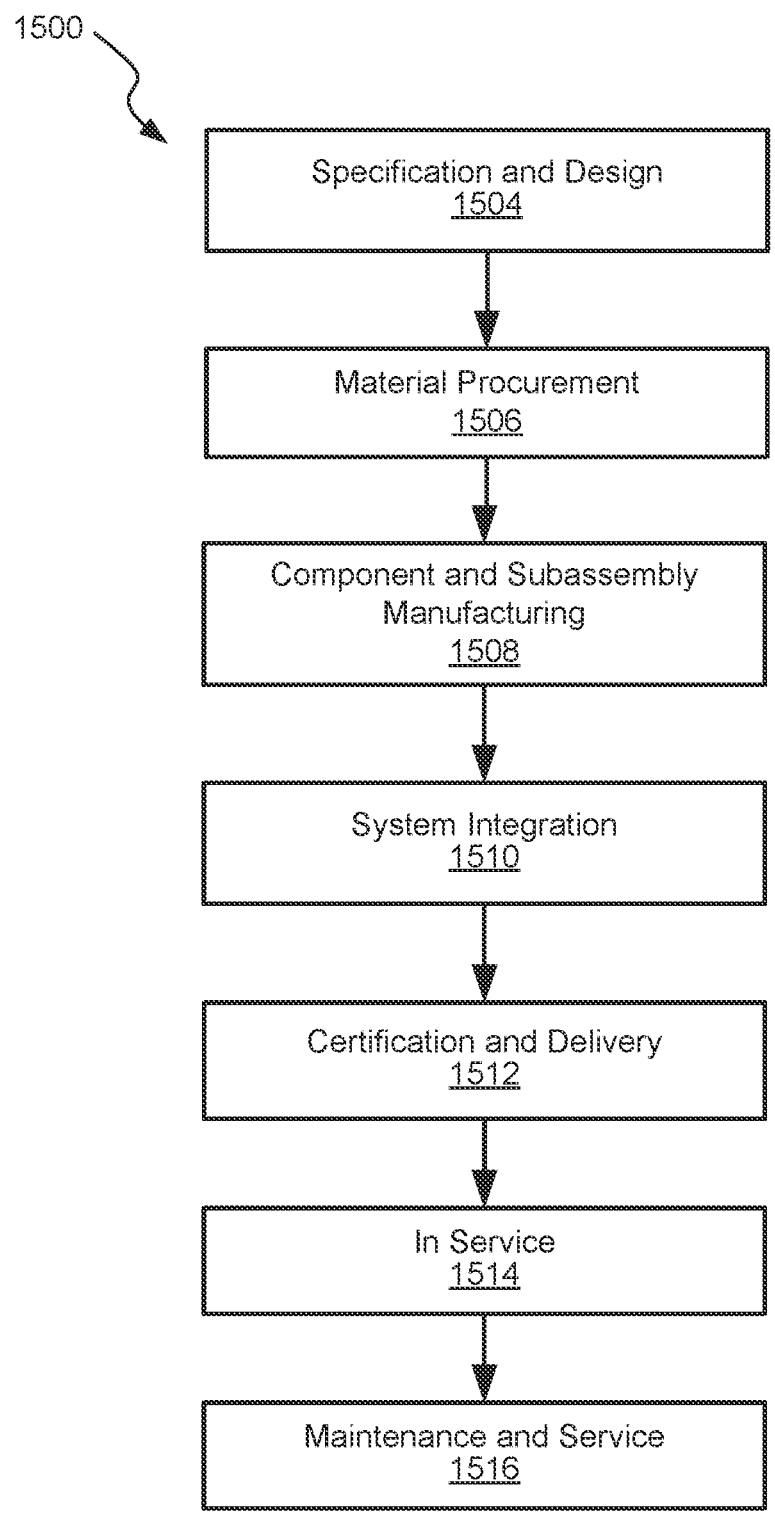
FIG. 15 illustrates an aircraft manufacturing and service method for the aircraft shown in FIG. 15.

Examples of the present disclosure may be described in the context of aircraft manufacturing and service method 1500 as shown in FIG. 15 and aircraft 1400 as shown in FIG. 14. During pre-production, illustrative method 1500 may include specification and design (block 1504) of aircraft 1400 and material procurement (block 1506). During production, component and subassembly manufacturing (block 1508) and inspection system integration (block 1510) of aircraft 1400 may take place. Described methods, and assemblies formed by these methods, can be used in any of specification and design (block 1504) of aircraft 1400, material procurement (block 1506), component and subassembly manufacturing (block 1508), and/or inspection system integration (block 1510) of aircraft 1400.

Thereafter, aircraft 1400 may go through certification and delivery (block 1512) to be placed in service (block 1514). While in service, aircraft 1400 may be scheduled for routine maintenance and service (block 1516). Routine maintenance and service may include modification, reconfiguration, refurbishment, etc. of one or more inspection systems of aircraft 1400. Described methods, and assemblies formed by these methods, can be used in any of certification and delivery (block 1512), service (block 1514), and/or routine maintenance and service (block 1516).

Each of the processes of illustrative method 1500 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 1500). For example, components or subassemblies corresponding to component and subassembly manufacturing (block 1508) may be fabricated or manufactured in a manner similar to components or subassemblies produced while aircraft 1400 is in service (block 1514). Also, one or more examples of the apparatus(es), method(s), or combination thereof may be utilized during production stages (block 1508) and (block 1510), for example, by substantially expediting assembly of or reducing the cost of aircraft 1400. Similarly, one or more examples of the apparatus or method realizations, or a combination thereof, may be utilized, for example and without limitation, while aircraft 1400 is in service (block 1514) and/or during maintenance and service (block 1516).

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific examples thereof, it will be understood by those skilled in the art that changes in the form and details of the disclosed examples may be made without departing from the spirit or scope of the disclosure. It is therefore intended that the disclosure be interpreted to include all variations and equivalents that fall within the true spirit and scope of the present disclosure.

Clause 1: A system for autonomous taxi route execution for an aircraft comprising a processor; and a memory, the memory storing instructions, when executed by the processor, cause the processor to receive clearance communication from a ground control station, generate a plurality of objects from the clearance communication, generate a context data structure representing a planned taxi route, and execute the planned taxi route.

Clause 2: The system of Clause 1, wherein the context data structure includes a route, a clearance command, and one or more hold commands.

Clause 3: The system of Clause 1 or 2, wherein executing the planned taxi route includes causing a vehicle management system to control movement of the aircraft along an input ground path.

Clause 4: The system of Clause 3, wherein the input ground path is a sequence of waypoints, wherein a waypoint comprises a position on an airport surface, a heading, and a ground speed.

Clause 5: The system of any of Clauses 1-4, wherein the clearance command is received at a front end module from the ground control station in text format.

Clause 6: The system of Clause 5, wherein the front end module interprets the clearance command and determines whether the clearance command contains a taxi or exit command, and if the clearance command contains a taxi or exit command, then the front end module sends the taxi or exit command to a clearance manager module.

Clause 7: The system of Clause 6, wherein the clearance manager module creates the context data structure using the taxi or exit command.

Clause 8: The system of Clause 7, wherein after the clearance manager module creates the context data structure, the clearance manager module sends the context data structure to an auto taxi module.

Clause 9: The system of Clause 8, wherein the auto taxi module includes the scratchpad memory and the active slot, and wherein the auto taxi module operates in three distinct modes: standby, ready, and active.

Clause 10: The system of any of Clauses 1-9, wherein executing the planned taxi route includes computing and recomputing an active leg, the active leg being a current leg that is being executed upon until a hold or stop point is reached.

Clause 11: The system of any of Clauses 1-10, wherein during execution of the planned taxi route, upon receiving a cross clearance command, a current hold command is disabled and the active leg is recomputed using a previous leg before the hold command and a following leg after the hold command.

Clause 12: The system of any of Clauses 1-11, herein executing the planned taxi route includes actively listening for on-the-fly hold commands.

Clause 13: The system of any of Clauses 1-12, wherein a command clearance command includes an aircraft identifier, an action command, a runway, and one or more taxiways.

Clause 14: The system of any of Clauses 1-13, wherein a clearance command is parsed into a clearance object.

Clause 15: The system of any of Clauses 1-14, wherein the planned taxi route is generated via a route planner module, wherein the route planner module generates the planned taxi route using a start position, an abstract destination, an abstract route definition, an airport map, and an aircraft kinetic model.

Clause 16: The system of any of Clauses 1-15, wherein the method further includes parsing the clearance communication before generating the plurality of objects from the clearance communication.

Clause 17: The system of any of Clauses 1-16, wherein the method further comprises checking the plurality of objects for errors before generating a context data structure representing the planned taxi route.

Clause 18: The system of any of Clauses 1-17, wherein executing the planned taxi route includes storing the context data structure in scratchpad memory and moving the context data structure into an active slot upon receiving an execute command.

Clause 19: The system of any of Clauses 1-18, wherein the aircraft is an unmanned aircraft.

Clause 20: A system comprising a front end module configured to receive clearance communication from a ground control station, a route planner configured to generate a planned taxi route from the clearance communication, a clearance manager configured to generate a plurality of objects from the clearance communication, wherein the clearance manager is further configured to generate a context data structure representing the planned taxi route, and an auto taxi module configured to execute the planned taxi route.

Clause 21: A method for executing a planned taxi route, comprising receiving a context data structure representing a planned taxi route, storing the context data structure in scratchpad memory, moving the context data structure into an active slot upon receiving an execute command, wherein the context data structure includes a planned taxi route object, the planned taxi route object including a series of waypoints organized into a set of legs, and following each leg until a hold or an end of the planned taxi route is reached, wherein at each hold command, a subset of waypoints corresponding to the next leg is not transmitted to a vehicle management system until the hold command is cleared with a cross command, wherein once a hold command is cleared, the subset of waypoints corresponding to the next leg is transmitted to the vehicle management system.

What is claimed is:

1. A system for autonomous taxi route execution for an aircraft, the system comprising:
   a processor; and
   memory, the memory storing instructions, when executed by the processor; cause the processor to:
   receive, with a front-end module, a first ground control station (GCS) message from a ground control station;
   determine that the first GCS message includes a clearance command;
   determine, from the clearance command, a context data structure representing a planned taxi route, wherein the context data structure comprises a first waypoint, a first leg ending at the first waypoint a first hold action object linked to the first waypoint, and a first hold clearance object linked to the first hold action object, and wherein the first hold action object being linked to the first hold clearance object activates a hold action internal state associated with the first waypoint;
   cause the aircraft to autonomously taxi along the first leg;
   cause the aircraft to autonomously hold at the first waypoint based on the activated hold action internal state associated with the first waypoint;
   receive, with the front-end module, a second GCS message from the ground control station;
   determine that the second GCS message includes a cross clearance;
   create a first cross clearance object within the context data structure;

delink, based on the creating the first cross clearance object, the first hold action object from the first hold clearance object;

link the first cross clearance object to the first hold action object to deactivate the hold action internal state associated with the first waypoint; and cause the aircraft to autonomously resume taxiing based on the deactivated hold action internal state associated with the first waypoint.

2. The system of claim 1, further comprising:
a vehicle management system configured to control movement of the aircraft along an input ground path.

3. The system of claim 2, wherein the input ground path is a sequence of waypoints, and wherein each waypoint comprises a position on an airport surface, a heading, and a ground speed.

4. The system of claim 1, wherein the clearance command is received at a front end module from the ground control station in text format.

5. The system of claim 4, wherein the front end module is configured to interpret the clearance command and determine whether the clearance command contains a taxi or exit command, and upon determining that the clearance command contains the taxi or exit command, the front end module sends the taxi or exit command to a clearance manager module.

6. The system of claim 5, wherein the clearance manager module determines the context data structure using the taxi or exit command.

7. The system of claim 6, wherein after the clearance manager module determines the context data structure, the clearance manager module sends the context data structure to an auto taxi module.

8. The system of claim 7, wherein the auto taxi module includes a scratchpad memory and an active slot, and wherein the auto taxi module operates in three distinct modes: standby, ready, and active.

9. The system of claim 1, wherein the memory further comprises instructions to:
actively listening for on-the-fly hold commands.

10. The system of claim 1, wherein a command clearance command includes an aircraft identifier, an action command, a runway, and one or more taxiways.

11. The system of claim 1, wherein a clearance command is parsed into a clearance object.

12. The system of claim 1, wherein the planned taxi route is generated via a route planner module, and wherein the route planner module generates the planned taxi route using a start position, an abstract destination, an abstract route definition, an airport map, and an aircraft kinetic model.

13. The system of claim 1, wherein the method memory further comprises instructions to:
parse the first GCS message before generating the objects of the context data structure.

14. The system of claim 1, wherein the memory further comprises instructions to:
check the objects of the context data structure for errors.

15. The system of claim 1, wherein the causing the aircraft to autonomously taxi along the first leg comprises:
storing the context data structure in scratchpad memory; and
moving the context data structure into an active slot upon receiving an execute command.

16. The system of claim 1, wherein the aircraft is an unmanned aircraft.

17. A system for autonomous taxi route execution for an aircraft, the system comprising:

a front end module configured to:
receive a first ground control station (GCS) message from a ground control station;
determine that the first GCS message includes a clearance command;
receive a second GCS message from the ground control station; and
determine that the second GCS message includes a cross clearance; and a clearance manager configured to:
determine from the clearance command, a context data structure representing a planned taxi route, wherein the context data structure comprises a first waypoint, a first leg ending at the first waypoint, a first hold action object linked to the first waypoint, and a first hold clearance object linked to the first hold action object and wherein the first hold action object being linked to the first hold clearance object activates a hold action internal state associated with the first waypoint; and create, from the second GCS message, a first cross clearance object within the context data structure; and an auto taxi module configured to:
cause the aircraft to autonomously taxi along the first leg;
cause the aircraft to autonomously hold at the first waypoint based on the activated hold action internal state associated with the first waypoint;
delink, based on the creating the first cross clearance object, the first hold action object from the first hold clearance object;
link the first cross clearance object to the first hold action object to deactivate the hold action internal state associated with the first waypoint; and
cause the aircraft to autonomously resume taxiing based on the deactivated hold action internal state associated with the first waypoint.

18. The system of claim 17, further comprising:
a route planner, configured to generate a planned taxi route from the first GCS message.

19. The system of claim 17, further comprising:
a vehicle management system configured to control movement of the aircraft along an input ground path.

20. The system of claim 17, wherein the front end module is configured to receive the clearance command in text format.

21. A method for autonomously executing a planned taxi route with an aircraft, the method comprising:
receiving a first ground control station (GCS) message from a ground control station;
determining that the first GCS message includes a clearance command;
determining, from the clearance command, a context data structure representing a planned taxi route, wherein the context data structure comprises a first waypoint, a first leg ending at the first waypoint a first hold action object linked to the first waypoint, and a first hold clearance object linked to the first hold action object, and wherein the first hold action object being linked to the first hold clearance object activates a hold action internal state associated with the first waypoint;
storing the context data structure in scratchpad memory;
moving the context data structure into an active slot upon receiving an execute command;
causing the aircraft to autonomously taxi along the first leg;

causing the aircraft to autonomously hold at the first waypoint based on the activated hold action internal state associated with the first waypoint;
receiving a second GCS message from the ground control station;
determining that the second GCS message includes a cross clearance;
creating a first cross clearance object within the context data structure;
delinking, based on the creating the first cross clearance object, the first hold action object from the first hold clearance object;
linking the first cross clearance object to the first hold action object to deactivate the hold action internal state associated with the first waypoint; and
causing the aircraft to autonomously resume taxiing based on the deactivated hold action internal state associated with the first waypoint.

\* \* \* \* \*